(12) United States Patent
Suzuki et al.

(10) Patent No.: US 12,291,853 B2
(45) Date of Patent: May 6, 2025

(54) DISPLAY DEVICE AND WORK MACHINE COMPRISING SAME

(71) Applicant: Yanmar Holdings Co., Ltd., Osaka (JP)

(72) Inventors: Shogo Suzuki, Chikugo (JP); Daisuke Kawaguchi, Chikugo (JP); Kazuki Tamura, Chikugo (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 62 days.

(21) Appl. No.: 18/020,839

(22) PCT Filed: Aug. 11, 2021

(86) PCT No.: PCT/JP2021/029594
§ 371 (c)(1),
(2) Date: Feb. 10, 2023

(87) PCT Pub. No.: WO2022/034893
PCT Pub. Date: Feb. 17, 2022

(65) Prior Publication Data
US 2023/0304266 A1    Sep. 28, 2023

(30) Foreign Application Priority Data
Aug. 11, 2020  (JP) ................. 2020-135801

(51) Int. Cl.
*E02F 9/26*  (2006.01)
*B60K 35/00*  (2006.01)
(Continued)

(52) U.S. Cl.
CPC .............. *E02F 9/267* (2013.01); *B60K 35/00* (2013.01); *B60W 50/0205* (2013.01);
(Continued)

(58) Field of Classification Search
USPC ...... 340/438, 691.6, 425.5, 449, 450.1, 463, 340/507, 525–527, 539.1, 539.26–539.29,
(Continued)

(56) References Cited

U.S. PATENT DOCUMENTS 5,970,217 A * 10/1999 Nakamura ............. B41J 29/393
358/1.14
6,718,057 B1 *  4/2004 Mori ......................... G06T 7/73
382/141
(Continued)

FOREIGN PATENT DOCUMENTS

JP      2011-231488 A    11/2011
WO   2013/047408 A1     4/2013

OTHER PUBLICATIONS

International Search Report dated Oct. 26, 2021 issued in corresponding PCT Application PCT/JP2021/029594.
(Continued)

*Primary Examiner* — Daniel Previl
(74) *Attorney, Agent, or Firm* — NORTON ROSE FULBRIGHT US LLP

(57) ABSTRACT

This display device includes a display unit, a receiving unit, and a control unit. The display unit displays a first screen having a selection item display area. The receiving unit receives a command for selecting a selection item displayed in the selection item display area. The control unit displays, on the basis of alarm information which indicates that an error has occurred, an alarm mark image in the selection item display area. When the alarm mark image is displayed in the selection item display area, the control unit assigns, to the receiving unit, a function of receiving an alarm mark selection command which is the command for selecting the alarm mark image. When the receiving unit receives the alarm mark selection command, the control unit displays, on
(Continued)

the display unit, a second screen for indicating the content of the error.

16 Claims, 12 Drawing Sheets

(51) Int. Cl.
*B60W 50/02* (2012.01)
*B60W 50/14* (2020.01)
*B60K 35/28* (2024.01)
*B60K 35/29* (2024.01)

(52) U.S. Cl.
CPC ............. *B60W 50/14* (2013.01); *B60K 35/28* (2024.01); *B60K 35/29* (2024.01); *B60K 2360/178* (2024.01); *B60K 2360/188* (2024.01); *B60W 2050/146* (2013.01); *B60W 2300/17* (2013.01)

(58) Field of Classification Search
USPC .......................................................... 340/571
See application file for complete search history.

(56) References Cited

U.S. PATENT DOCUMENTS

| | | | |
|---|---|---|---|
| 9,137,353 B2 * | 9/2015 | Miura | G06F 3/04886 |
| 2003/0001751 A1 * | 1/2003 | Ogura | E02F 9/2296 |
| | | | 340/425.5 |
| 2012/0099147 A1 * | 4/2012 | Tanaka | G06F 3/1228 |
| | | | 358/1.15 |
| 2014/0236418 A1 * | 8/2014 | Koga | G05B 23/0272 |
| | | | 701/31.6 |
| 2016/0124626 A1 * | 5/2016 | Lee | H04M 1/72403 |
| | | | 715/747 |
| 2017/0173262 A1 * | 6/2017 | Veltz | G16H 20/17 |
| 2018/0157378 A1 * | 6/2018 | Noda | G06F 3/048 |

OTHER PUBLICATIONS

Japanese Office Action issued dated Aug. 8, 2023 issued in JP Application No. 2020135801.

* cited by examiner

FIG. 11
(a)
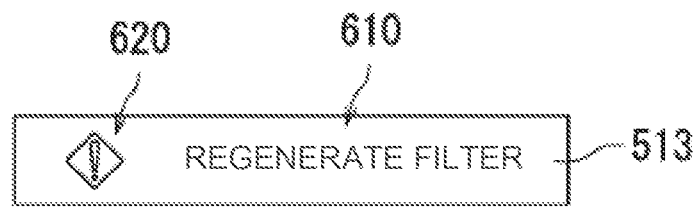
(b)
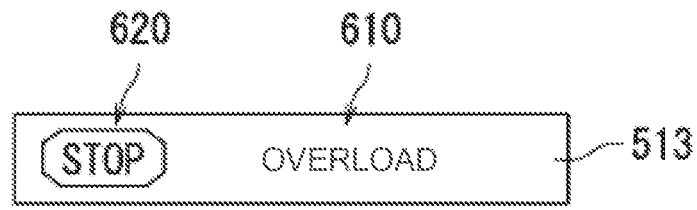

DISPLAY DEVICE AND WORK MACHINE COMPRISING SAME

CROSS-REFERENCE TO RELATED APPLICATIONS

This application is a national stage application pursuant to 35 U.S.C. § 371 of International Application No. PCT/JP2021/029594, filed on Aug. 11, 2021, which claims priority under 35 U.S.C. § 119 to Japanese Patent Application No. 2020-135801 filed on Aug. 11, 2020, the disclosures of which are hereby incorporated by reference in their entireties.

TECHNICAL FIELD

The present invention relates to a display device and a work machine provided with the same.

BACKGROUND ART

A display device that displays a warning logo on a basic screen when an abnormality occurs has been proposed (see, for example, Patent Literature 1). The display device in Patent Literature 1 displays a menu screen when an operation switch is operated with the warning logo in a state of being displayed on the basic screen. A warning item is added to the menu screen. The display device in Patent Literature 1 displays a warning list screen when the operation switch is operated with the cursor in a state of selecting the warning item. The warning list screen displays the warning logo and a warning name.

CITATION LIST

Patent Literature

Patent Literature 1: Japanese Unexamined Patent Application Publication No. 2011-231488

DISCLOSURE OF INVENTION

Problems to be Solved by the Invention

However, in the display device of Patent Literature 1, a worker needs to display the menu screen from the basic screen, and display the warning list screen from the menu screen. Due to this, the worker needs to do a complicated operation to check the content of the warning.

The present invention has been made in view of the above issue, and it is an object of the present invention to provide a display device capable of checking a content of an error without doing a complicated operation, and a work machine equipped with the same.

Means for Solving the Problems

A display device according to the present invention includes: a display unit, a receiving unit, and a control unit. The display unit displays a first screen having a selection item display area. The receiving unit receives a command for selecting a selection item displayed in the selection item display area. The control unit, based on alarm information which indicates that an error has occurred, causes the selection item display area to display an alarm mark image. When the alarm mark image is displayed in the selection item display area, the control unit assigns, to the receiving unit, a function of receiving an alarm mark selection command which is a command for selecting the alarm mark image. When the receiving unit receives the alarm mark selection command, the control unit causes the display unit to display a second screen indicating contents of the error.

Effect of the Invention

According to the present invention, the content of the error can be checked without doing a complicated operation.

BRIEF DESCRIPTION OF DRAWINGS

FIG. 11(*a*) shows another example 1 of the error message. FIG. 11(*b*) shows another example 2 of the error message.

DESCRIPTION OF EMBODIMENTS

Figure 1:
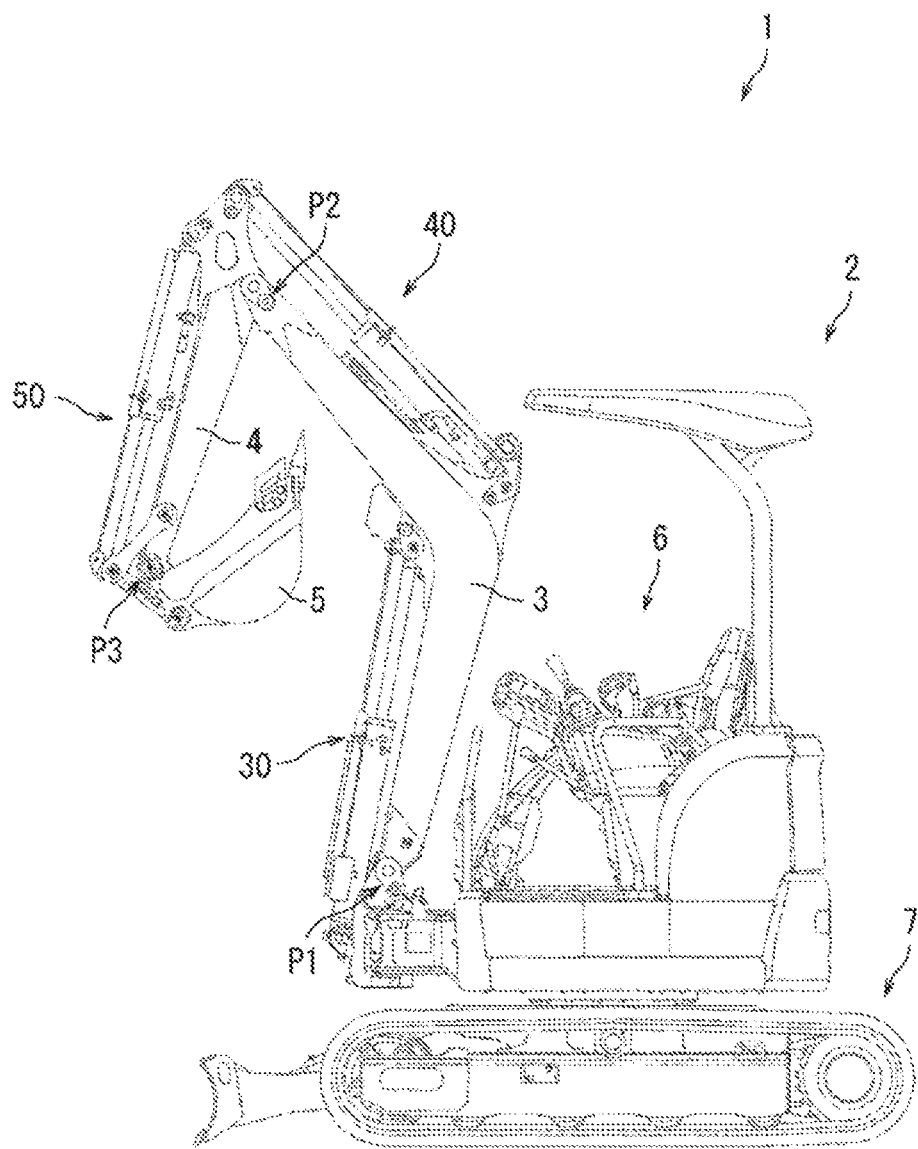
FIG. 1 is a side view of a work machine according to an embodiment of the present invention.

The following is a description of an embodiment according to a display device and work machine of the present invention with reference to the drawings (FIGS. 1 to 12). Note that the present invention is not limited to the embodiment below. Any duplicated explanation is, as the case may be, properly omitted. Note that, in the drawings, the same reference signs are used for the same or equivalent components, and repeated descriptions are to be omitted.

First, a work machine 1 of the present embodiment is to be described with reference to FIGS. 1 to 3. FIG. 1 shows a side view of the work machine 1 of the present embodiment. As shown in FIG. 1, the work machine 1 is a backhoe. The backhoe is a type of construction machine. The work machine 1 of the present embodiment has a machine body 2, a boom 3, an arm 4, a bucket 5, and a run device 7. The work machine 1 of the present embodiment is further provided with a boom actuator 30, an arm actuator 40, and an attachment actuator 50.

The machine body 2 has a driver seat 6. A worker sits on the driver seat 6 and operates the work machine 1. The machine body 2 is supported by the run device 7. The machine body 2 may be swingably supported by the run device 7. The machine body 2 is provided with an engine 12 (see FIG. 3), a fuel tank, a battery, a hydraulic system, and a hydraulic oil tank. Also, the machine body 2 has a hood that houses the engine 12 (see FIG. 3), the fuel tank, the battery, the hydraulic system, and the hydraulic oil tank, and the driver seat 6 is placed on the hood.

The boom 3 is so supported by the machine body 2 as to swing around a first rotation supporting point P1. Specifically, a base end portion of the boom 3 is axially supported by the machine body 2. The first rotation supporting point P1 is a rotary axis that extends along the right/left direction that is observed when the driver seat 6 is viewed from the front. Hereafter, the right/left direction that is observed when the driver seat 6 is viewed from the front, as the case may be, is described as the "right/left direction".

The boom actuator 30 actuates the boom 3. Specifically, the boom actuator 30, by extending and retracting, swings the boom 3 around the first rotation supporting point P1. In detail, controlling the hydraulic oil supplied to the boom actuator 30 and the hydraulic oil discharged from the boom actuator 30 extends and retracts the boom actuator 30. Thus, the boom actuator 30 is extended and retracted by the hydraulic oil.

The arm 4 is so supported by the boom 3 as to swing around a second rotation supporting point P2. Specifically, a base end portion of the arm 4 is axially supported at a tip portion of the boom 3. The second rotation supporting point P2 is a rotary axis extending along the right/left direction.

The arm actuator 40 actuates the arm 4. Specifically, the arm actuator 40, by extending and retracting, swings the arm 4 around the second rotation supporting point P2. In detail, controlling the hydraulic oil supplied to the arm actuator 40 and the hydraulic oil discharged from the arm actuator 40 extends and retracts the arm actuator 40. Thus, the arm actuator 40 is extended and retracted by the hydraulic oil.

The bucket 5 is a type of attachment. The bucket 5 is so supported by the arm 4 as to swing around a third rotation supporting point P3. Specifically, the bucket 5 is axially supported at a tip portion of the arm 4. The third rotation supporting point P3 is a rotary axis extending along the right/left direction.

The attachment actuator 50 actuates the bucket 5. Specifically, the attachment actuator 50, by extending and retracting, swings the bucket 5 around the third rotation supporting point P3. In detail, controlling the hydraulic oil supplied to the attachment actuator 50 and the hydraulic oil discharged from the attachment actuator 50 extends and retracts the actuator 50. Thus, the attachment actuator 50 is extended and retracted by the hydraulic oil.

The run device 7 causes the work machine 1 to run. In the present embodiment, the run device 7 is a crawler-type run device.

Figure 2:
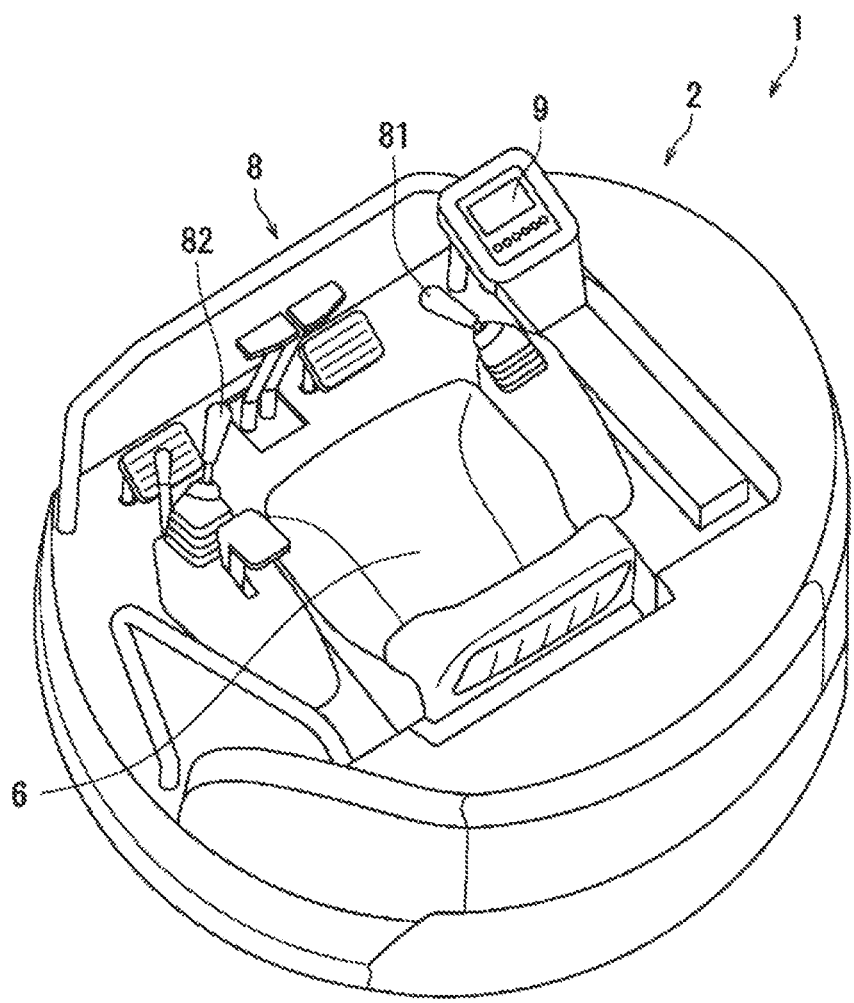
FIG. 2 is a perspective view of a machine body in the work machine.
Figure 3:
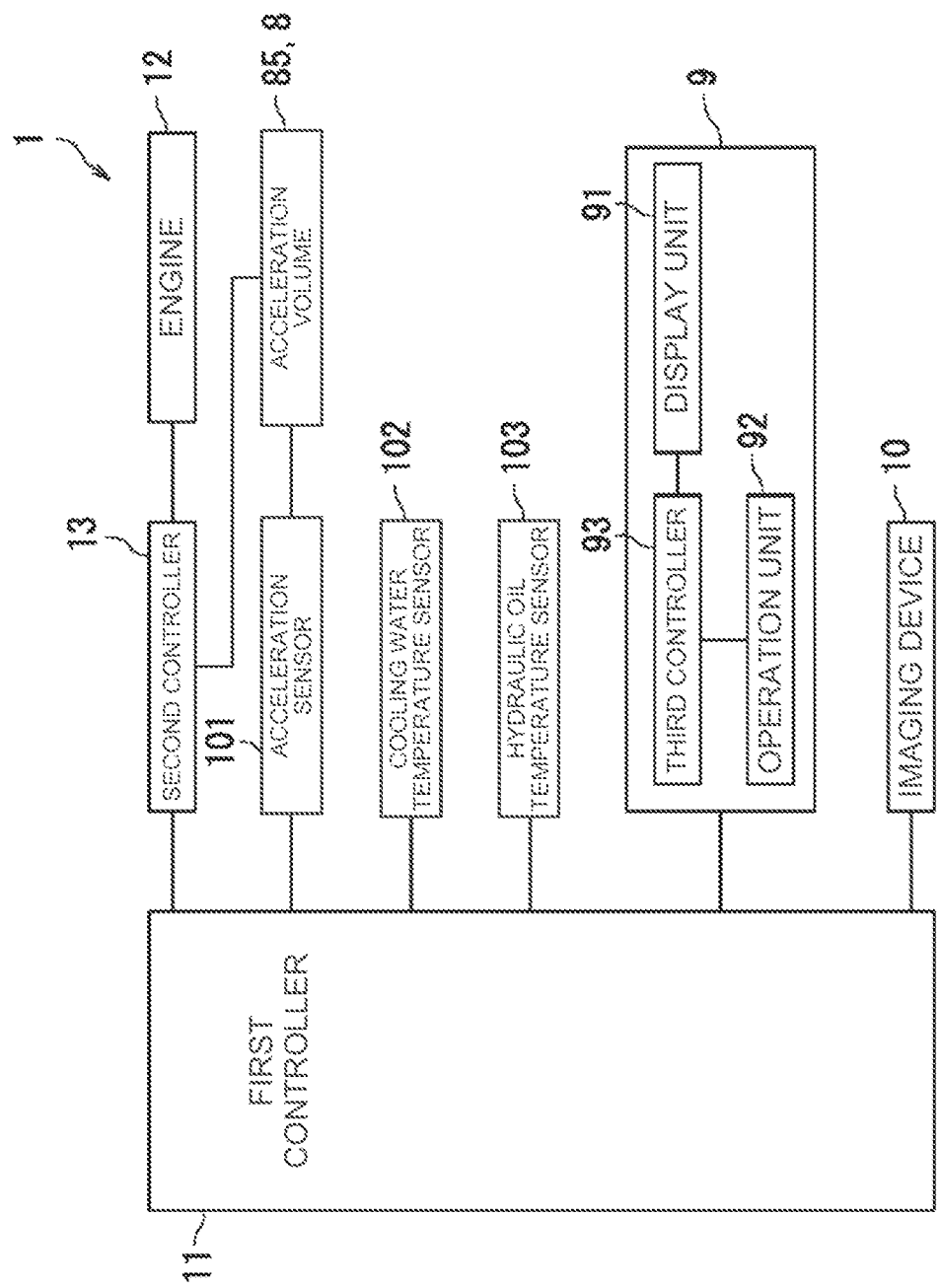
FIG. 3 is a block diagram of the work machine according to the embodiment of the present invention.

Then, referring to FIGS. 1 and 2, the configuration of the work machine 1 is described in more detail. Specifically, the configuration around the driver seat 6 is to be described. FIG. 2 is a perspective view of the machine body 2 in the work machine 1.

As shown in FIG. 2, the work machine 1 is further provided with a steering unit 8 and a display device 9. The steering unit 8 and the display device 9 are installed on the machine body 2. Specifically, the steering unit 8 and the display device 9 are placed in front of the driver seat 6.

The steering unit 8 includes various operation members for the worker to steer the work machine 1. Various operation members include a boom operation lever 81 and an arm operation lever 82. The worker manually operates the boom operation lever 81 and the arm operation lever 82. The worker operates the boom operation lever 81, making it possible to operate the boom 3. Also, the worker operates the arm operation lever 82, making it possible to operate the arm 4.

The display device 9 displays various screens. For details, as described below with reference to FIGS. 4 to 8, etc., the display device 9 displays a home screen 510. Also, as described below with reference to FIG. 9, etc., the display device 9 displays an error information screen 520. Also, as described below with reference to FIG. 10, etc., the display device 9 displays an error information detail screen 530.

Then, the configuration of the work machine 1 of the present embodiment is further described with reference to FIGS. 1 to 3. FIG. 3 is a block diagram of the work machine 1 of the present embodiment. As shown in FIG. 3, the work machine 1 is further equipped with an imaging device 10, a first controller 11, the engine 12, and a second controller 13. Also, the work machine 1 is provided with various sensors. In the present embodiment, the work machine 1 is provided with an acceleration sensor 101, a cooling water temperature sensor 102, and a hydraulic oil temperature sensor 103. Also, the steering unit 8 further includes an acceleration volume 85.

The imaging device 10 takes an image of an environment surrounding the work machine 1 thereby to generate a taken image G (video image). Specifically, the imaging device 10 takes an image behind the driver seat 6. The taken image G is displayed by the display device 9. Specifically, when prohibition of the work machine 1's operation is cancelled, the first controller 11 instructs the display device 9 to display the taken image G. In detail, with the engine 12's key on, the first controller 11, when detecting that a cutoff lever that prohibits the work machine 1's operation is lowered, instructs the display device 9 to display the taken image G.

The engine 12 generates a drive force that drives the run device 7. The second controller 13 controls the engine 12 based on a command sent from the first controller 11.

The second controller 13 includes, for example, a processing unit that executes various processes, a storage unit that stores various programs and various data, and an input/output interface. The processing unit includes, for example, a processor, which executes various calculations, such as CPU (Central Processing Unit) or MPU (Micro Processing Unit). Or, the processing unit may be composed of a general-purpose calculator. The storage unit includes, for example, a semiconductor memory. The storage unit includes a RAM (Random Access Memory) and a ROM (Read Only Memory), for example. The storage unit may further include non-volatile memories such as an EEPROM (registered trademark) or a flash memory. The second controller 13 includes, for example, an ECU (Electronic Control Unit).

The worker manually operates the acceleration volume 85. The acceleration volume 85 is electrically connected to the second controller 13. The worker operates the acceleration volume 85 forward or reverse, thus increasing or decreasing the engine 12's rpm.

The acceleration sensor 101 detects an operation position (rotational position) of the acceleration volume 85. To the second controller 13, the first controller 11 sends a command that controls the amount and timing of fuel injection into the engine 12 based on the acceleration volume 85's operation position detected by the acceleration sensor 101.

Further, the first controller 11 determines whether or not the acceleration volume 85's operation position detected by the acceleration sensor 101 shows an abnormal value (outlier). By comparing the acceleration volume 85's operation position detected by the acceleration sensor 101 with a threshold value, for example, the first controller 11 may determine whether or not the acceleration volume 85's operation position detected by the acceleration sensor 101 shows the abnormal value (outlier).

The cooling water temperature sensor 102 detects the temperature of the cooling water circulating in the engine 12. The first controller 11 determines whether or the cooling water's temperature detected by the cooling water temperature sensor 102 shows an abnormal value (outlier). By comparing the cooling water's temperature detected by the cooling water temperature sensor 102 with a threshold value, for example, the first controller 11 may determine whether or the cooling water's temperature detected by the cooling water temperature sensor 102 shows the abnormal value (outlier).

The hydraulic oil temperature sensor 103 detects the hydraulic oil's temperature. The first controller 11 determines whether or not the hydraulic oil's temperature detected by the hydraulic oil temperature sensor 103 shows an abnormal value (outlier). By comparing the hydraulic oil's temperature detected by the hydraulic oil temperature sensor 103 with a threshold value, for example, the first controller 11 may determine whether or not the hydraulic oil's temperature detected by the hydraulic oil temperature sensor 103 shows the abnormal value (outlier).

The first controller 11 controls various portions of the work machine 1. The first controller 11 includes, for example, a processing unit that executes various processes, a storage unit that stores various programs and various data, and an input/output interface. The first controller 11 is composed of, for example, an ECU.

When detecting that an error has occurred to the work machine 1, the first controller 11 sends alarm information to the display device 9. The alarm information shows that the error is occurring to the work machine 1. In detail, the alarm information includes information that shows an error name, an error code, and an alarm level. Also, the alarm information includes information that shows a method of dealing with the error. The error name, the error code, the alarm level, and the method of dealing with errors are preset for each error that is expected to occur to the work machine 1. In the present embodiment, the first controller 11 is an example of a sending unit.

Specifically, when determining that the accelerator volume 85's operation position detected by the acceleration sensor 101 shows the abnormal value (outlier), the first controller 11 sends the alarm information to the display device 9. Similarly, when determining that the cooling water's temperature detected by the cooling water temperature sensor 102 shows the abnormal value (outlier), the first controller 11 sends the alarm information to the display device 9. Further, when determining that the hydraulic oil's temperature detected by the hydraulic oil temperature sensor 103 shows the abnormal value (outlier), the first controller 11 sends the alarm information to the display device 9.

The display device 9 has a display unit 91, an operation unit 92, and a third controller 93.

The display unit 91 is composed of a display, such as a liquid crystal display or an organic EL display. Based on the alarm information, the display unit 91 displays an image that shows that the error is occurring. Specifically, the third controller 93, based on the alarm information, causes the display unit 91 to display the image that shows that the error is occurring. Hereafter, an image indicating that the error is occurring is, as the case may be, described as an "error notification message".

The operation unit 92 is operated by the worker, thereby to receive various commands. The worker operates the operation unit 92, making it possible to input various commands to the third controller 93.

Based on various information sent from the first controller 11, the third controller 93 causes the display unit 91 to display various screens. The third controller 93 includes, for example, a processing unit that executes various processes, a storage unit that stores various programs and various data, and an input/output interface. The third controller 93 is composed of, for example, an ECU. The third controller 93 is an example of a control unit.

Figure 4:
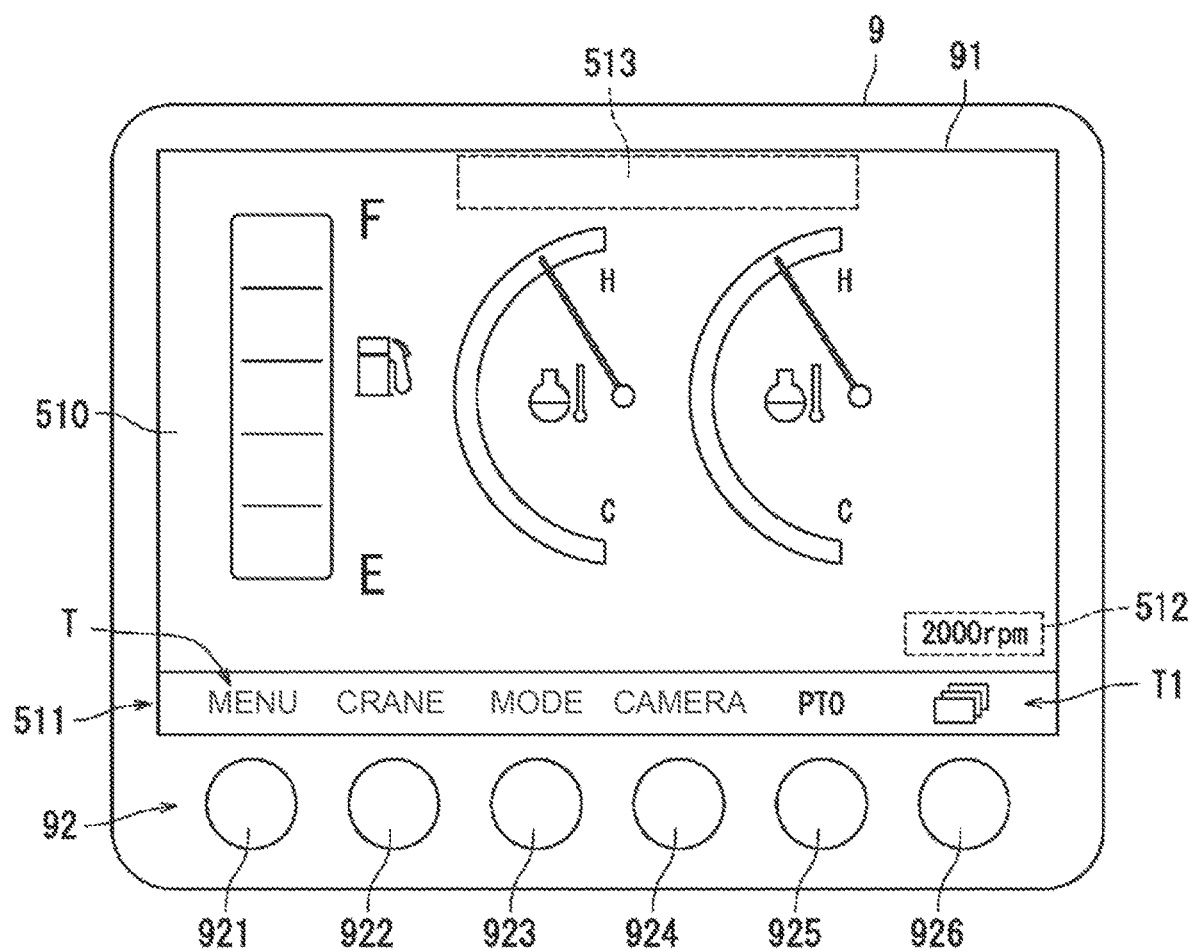
FIG. 4 is a diagram showing a display device according to the embodiment of the present invention.

Then, the display device 9 is to be further described with reference to FIGS. 1 to 10. FIG. 4 is a diagram showing the display device 9 of the present embodiment. In detail, FIG. 4 shows the display device 9 displaying the home screen 510. The home screen 510 is an example of a first screen. The home screen 510 displays, for example, a remaining fuel level gauge, a cooling water temperature gauge, and a hydraulic oil temperature gauge.

As shown in FIG. 4, the display unit 91 displays the home screen 510. The home screen 510 has a first selection item display area 511 and a first notification area 512. The first selection item display area 511 displays various selection items T. Specifically, the first selection item display area 511 displays a letter image (letter string image) or a mark showing the various selection items T. Marks are, for example, an icon, shape, or a pictogram. The first selection item display area 511 is placed at the lower portion of the home screen 510.

In the present embodiment, the operation unit 92 includes a plurality of operation switches. The operation switch is a hard key. Specifically, the operation unit 92 includes a first operation switch 921 to a sixth operation switch 926. The first operation switch 921 to sixth operation switch 926 are, in plan view, placed below the display unit 91. Thus, the first operation switch 921 to the sixth operation switch 926 are placed below the first selection item display area 511 in plan view.

The first operation switch 921 to the sixth operation switch 926 each correspond to one of the selection items T displayed in the first selection item display area 511. When the display unit 91 is displaying the home screen 510, the first operation switch 921 to the sixth operation switch 926 are each assigned a function of receiving a command for selecting the corresponding one of the selection items T displayed in the first selection item display area 511. That is, the first operation switch 921 to the sixth operation switch 926 respectively receive the command for selecting the corresponding selection items T. The first operation switch 921 to the sixth operation switch 926 are respectively placed below the corresponding selection items T in plan view. The operation unit 92 is an example of a receiving unit.

For example, the selection items T include a selection item T1, and the sixth operation switch 926 is assigned a function of receiving the command for selecting the selection item T1. The selection item T1 is an item for switching the information displayed in the first notification area 512. For example, each time the worker presses down the sixth operation switch 926, the third controller 93 switches the information, which is to be displayed in the first notification area 512, between information that shows the engine 12's RPM and information that shows the remaining fuel level.

According to the present embodiment, the operation unit 92 includes the hard keys (first operation switches 921 to sixth operation switches 926). Thus, the worker can operate the operation unit 92 while wearing a protective gear such as military gloves. According to the present embodiment, the first operation switch 921 to the sixth operation switch 926 are respectively placed below the corresponding selection items T in plan view. Thus, the worker can easily grasp the relation between the first operation switch 921 to the sixth operation switch 926 and the respective selection items T. As a result, the worker can easily select the desired selection item T.

The home screen 510 further has a second notification area 513. The second notification area 513 is placed at the upper portion of the home screen 510. When the first controller 11 detects the occurrence of the error, the third controller 93 causes the second notification area 513 to display an error message 610 and an alarm mark image 620 which are to be described with reference to FIG. 5, etc. That is, when receiving the alarm information from the first controller 11, the third controller 93 causes the second notification area 513 to display the error message 610 and the alarm mark image 620.

FIG. 4 shows the home screen 510 that is displayed at the display unit 91 when the first controller 11 has not detected the occurrence of the error. Thus, the error message 610 and the alarm mark image 620 are not displayed in the second notification area 513. In the following description, the second notification area 513 is, as the case may be, described as "alarm display area 513".

Figure 5:
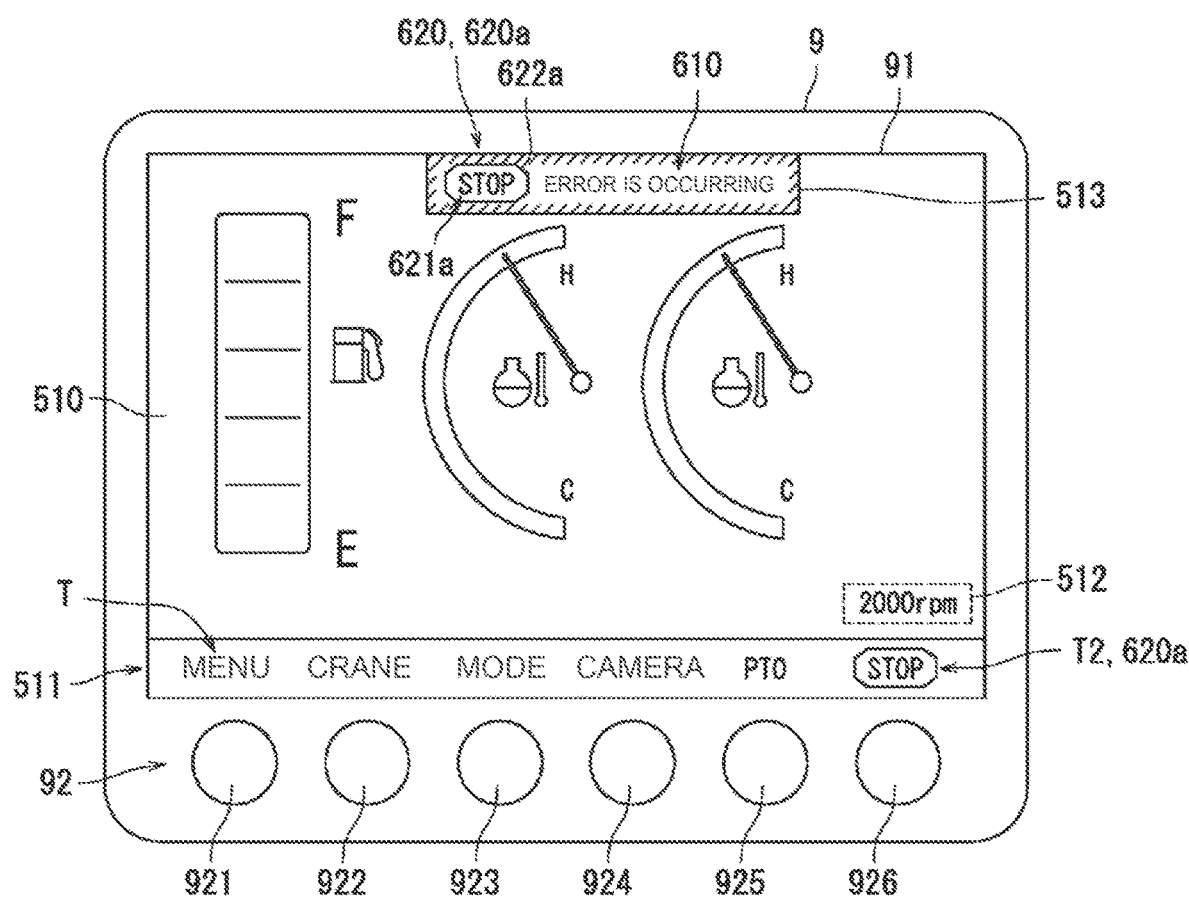
FIG. 5 is a diagram showing the display device displaying an error message and an alarm mark image.

Then, the display device 9 is further described with reference to FIGS. 1 to 5. FIG. 5 is a diagram showing the display device 9 displaying the error message 610 and the alarm mark image 620. As shown in FIG. 5, based on the alarm information, the third controller 93 causes the alarm display area 513 to display the error notification image. The error notification image includes the error message 610 and the alarm mark image 620. With the error notification image (error message 610 and alarm mark image 620) displayed in the alarm display area 513, the worker can visually recognize that the error is occurring to the work machine 1.

The error message 610 is the letter string image that shows that the error is occurring. For example, as shown in FIG. 5, the error message 610 is the string image indicating "ERROR IS OCCURRING". The error message 610 is an example of a given message. According to the present embodiment, the home screen 510 (alarm display area 513) displays the letter string image (error message 610) indicating that the error is occurring, making it possible for the worker to easily understand that the error is occurring to the work machine 1.

The alarm mark image 620 is a mark image that shows that the error is occurring. Specifically, the alarm mark image 620 shows the alarm level. Mark images are, for example, an icon, a graphic, or a pictogram. Specifically, in the present embodiment, the alarm levels include a first alarm level and a second alarm level. The first alarm level is set for the error due to which the work machine 1 needs to be stopped. The second alarm level is set for the error due to which the work machine 1 does not need to be stopped. Thus, when only the second alarm level error is occurring, the worker may continue the work by the work machine 1. The second alarm level is set for an error that is lower in priority than an error for which the first alarm level is set.

FIG. 5 shows the alarm mark image 620 that corresponds to the first alarm level. Hereinafter, the alarm mark image 620 that corresponds to the first alarm level is referred to as "first alarm mark image 620a". When at least one first alarm level error is occurring to the work machine 1, the third controller 93 causes the alarm display area 513 to display a first alarm mark image 620a. Thus, with the first alarm mark image 620a displayed on the home screen 510 (alarm display area 513), the worker can visually recognize that the first alarm level error is occurring to the work machine 1.

In the present embodiment, the error notification image includes the alarm display area 513's background color image. According to the alarm level, the third controller 93 determines the alarm display area 513's background color image. In other words, the third controller 93 changes the alarm display area 513's background color image according to the alarm level. Specifically, when the first alarm level error is occurring, the alarm display area 513's background color image is determined to be "red". Thus, from the alarm display area 513's background color image, the worker can visually recognize that the first alarm level error is occurring to the work machine 1.

Further, the first alarm mark image 620a includes a title image 621a and a graphic image 622a. The title image 621a is placed inside the graphic image 622a. The graphic image 622a's outline and the title image 621a are white, and a color (background color) inside the graphic image 622a is red. In the present embodiment, the title image 621a is a letter string image showing "STOP".

Then, the display device 9 is further described with reference to FIGS. 1 to 5. As shown in FIG. 5, based on the alarm information, the third controller 93 causes the first selection item display area 511 to display a selection item T2.

The selection item T2 is an item that is selected when the screen to be displayed at the display unit 91 is caused to transition from the home screen 510 to the error information screen 520 to be described with reference to FIG. 9. With the selection item T2 displayed in the first selection item display area 511, the operation unit 92 can receive a command for transition to the error information screen 520.

In detail, displaying the selection item T2 in the first selection item display area 511, the third controller 93, assigns, to one of the first operation switch 921 to the sixth operation switch 926, the function of receiving a command for selecting the selection item T2. In the present embodiment, the selection item T2 is displayed in place of the selection item T1 described with reference to FIG. 4. Thus, the function of receiving the command for selecting the selection item T2 is assigned to the sixth operation switch 926.

Specifically, the third controller 93 causes the alarm mark image 620 to be displayed as the selection item T2. Thus, to the sixth operation switch 926, the third controller 93 assigns the function of receiving the command for selecting the alarm mark image 620. Hereafter, the command for selecting the alarm mark image 620 is, as the case may be, described as "alarm mark selection command". In the example shown in FIG. 5, the alarm mark image 620 is the first alarm mark image 620a.

Thus, displaying the alarm mark image 620 as the selection item T2 causes the worker to more easily recognize the operation switch for transitioning to the error information screen 520. Further, displaying the first alarm mark image 620a as the selection item T2 causes the worker to visually recognize that the first alarm level error is occurring to the work machine 1.

Figure 6:
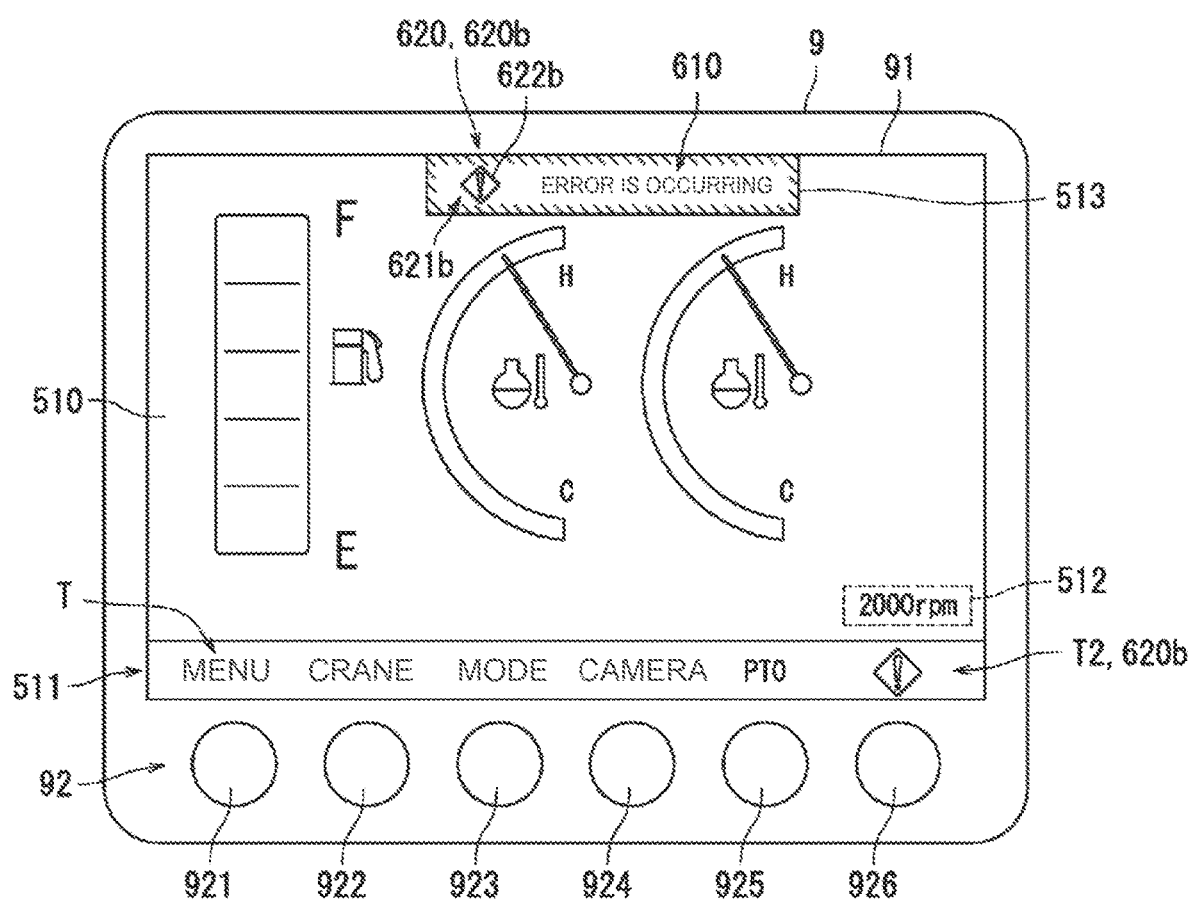
FIG. 6 is another diagram showing the display device displaying the error message and the alarm mark image.

Then, the display device 9 is to be further described with reference to FIGS. 1 to 6. FIG. 6 is another diagram showing the display device 9 displaying the error message 610 and the alarm mark image 620. In detail, FIG. 6 shows the home screen 510 that is displayed on the display device 9 when only the second alarm level error is occurring.

As shown in FIG. 6, when only the second alarm level error is occurring, the third controller 93 causes the alarm display area 513 to display the alarm mark image 620 that corresponds to the second alarm level. Hereinafter, the alarm mark image 620 that corresponds to the second alarm level is referred to as "second alarm mark image 620b". According to the present embodiment, when only the second alarm level error is occurring, the second alarm mark image 620b is displayed in the alarm display area 513. Thus, with the second alarm mark image 620b displayed on the home screen 510 (alarm display area 513), the worker can visually recognize that only the second alarm level error is occurring to the work machine 1.

When only the second alarm level error is occurring, the third controller 93 determines the alarm display area 513's background color image to be "yellow". Thus, from the alarm display area 513's background color image, the worker can visually recognize that only the second alarm level error is occurring to the work machine 1.

When only the second alarm level error is occurring, the third controller 93 causes the first selection item display area 511 to display the second alarm mark image 620b as the selection item T2. Thus, displaying the second alarm mark image 620b as the selection item T2 causes the worker to visually recognize that only the second alarm level error is occurring to the work machine 1.

Also, the second alarm mark image 620b includes a title image 621b and a graphic image 622b. The title image 621b is placed inside the graphic image 622b. The graphic image 622b's outline and the title image 621b are white, and a color (background color) inside the graphic image 622b is yellow. In the present embodiment, the title image 621b is an exclamation mark.

As described above, according to the present embodiment, the first alarm mark image 620a or the second alarm mark image 620b is displayed on the home screen 510 (alarm display area 513 and first selection item display area 511) in response to the alarm level. Thus, the worker can easily understand an emergency level of the error occurring to the work machine 1.

According to the present embodiment, the alarm display area 513's background color image can be changed according to the alarm level. Thus, the worker can easily recognize the emergency of the error occurring to the work machine 1.

According to the present embodiment; when plural errors are occurring to the work machine 1, the third controller 93, based on the alarm information with higher priority, causes the home screen 510 (alarm display area 513 and first selection item display area 511) to display the alarm mark image 620. Specifically, when the error for which the first alarm level is set and the error for which the second alarm level is set are occurring to the work machine 1, the third controller 93 causes the home screen 510 (alarm display area 513 and first selection item display area 511) to display the first alarm mark image 620a. Thus, the worker can easily grasp that the error of high priority (emergency) is occurring to the work machine 1.

According to the present embodiment, the first selection item display area 511 is placed at the lower portion of the home screen 510, and the alarm display area 513 is placed at the upper portion of the home screen 510. Then, the work machine 1's state quantities such as remaining fuel level, cooling water temperature, and hydraulic oil temperature are displayed between the first selection item display area 511 and the alarm display area 513. Thus, even when the error notification screen (error message 610, alarm mark image 620, and alarm display area 513's background color image) are displayed in the alarm display area 513, the worker can check the work machine 1's state quantities such as remaining fuel level, cooling water temperature, and hydraulic oil temperature.

Figure 7:
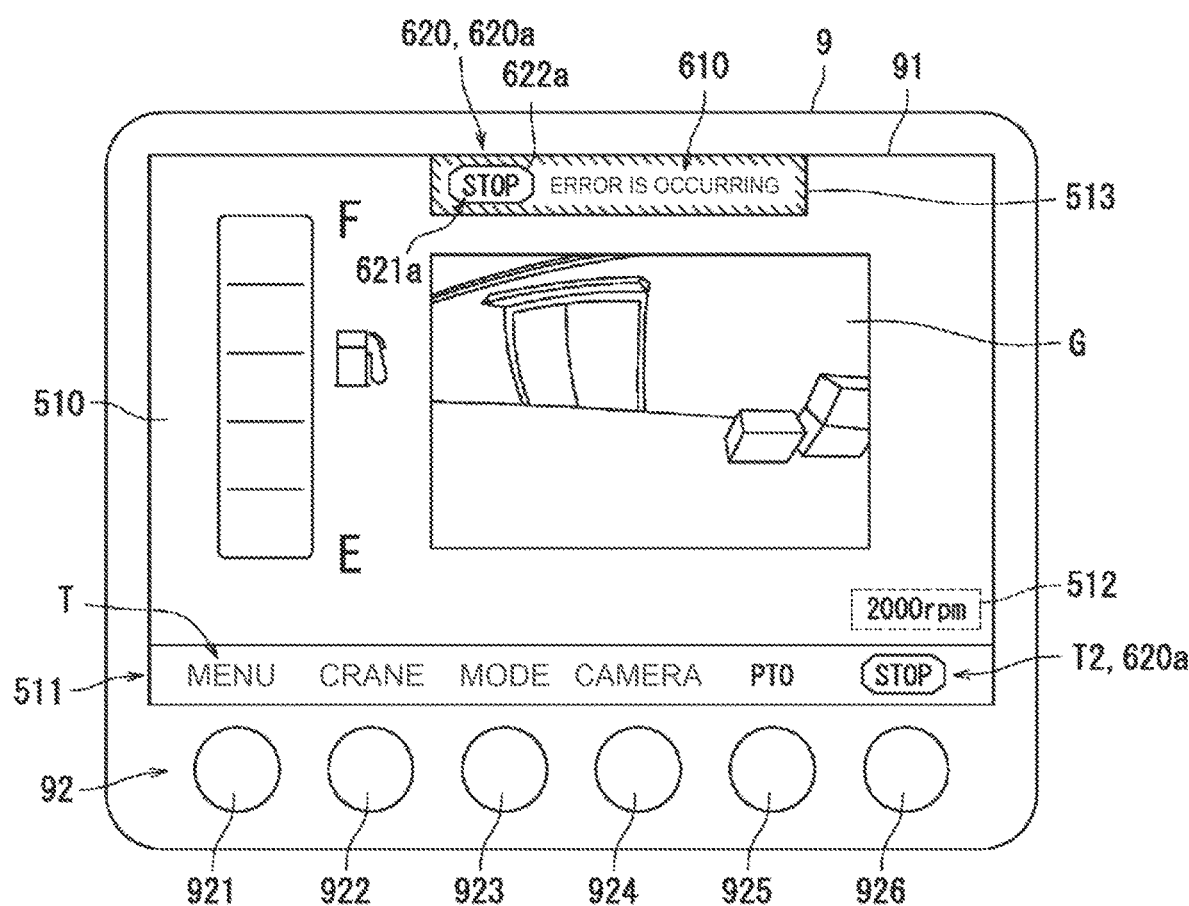
FIG. 7 is another diagram showing the display device displaying the error message and the alarm mark image.

Then, the display device 9 is to be further described with reference to FIGS. 1 to 8. FIG. 7 is a diagram showing the display device 9 displaying the error message 610 and the alarm mark image 620. In detail, FIG. 7 shows the display device 9 displaying the taken image G on the home screen 510. The taken image G is an image taken by the imaging device 10, as described referring to FIG. 3, and shows the environment surrounding the work machine 1 (the environment behind the driver seat 6).

As shown in FIG. 7, the third controller 93 superimposes the taken image G on the home screen 510. Specifically, being displayed between the first selection item display area 511 and the alarm display area 513, the taken image G is superimposed on a part of the remaining fuel level gauge, the coolant temperature gauge, and the hydraulic oil temperature gauge.

According to the present embodiment, the taken image G is displayed between the first selection item display area 511 and the alarm display area 513; thus, even when the error notification screen (error message 610, alarm mark image 620, and alarm display area 513's background color image) are displayed in the alarm display area 513, the worker can check the taken image G.

Figure 8:
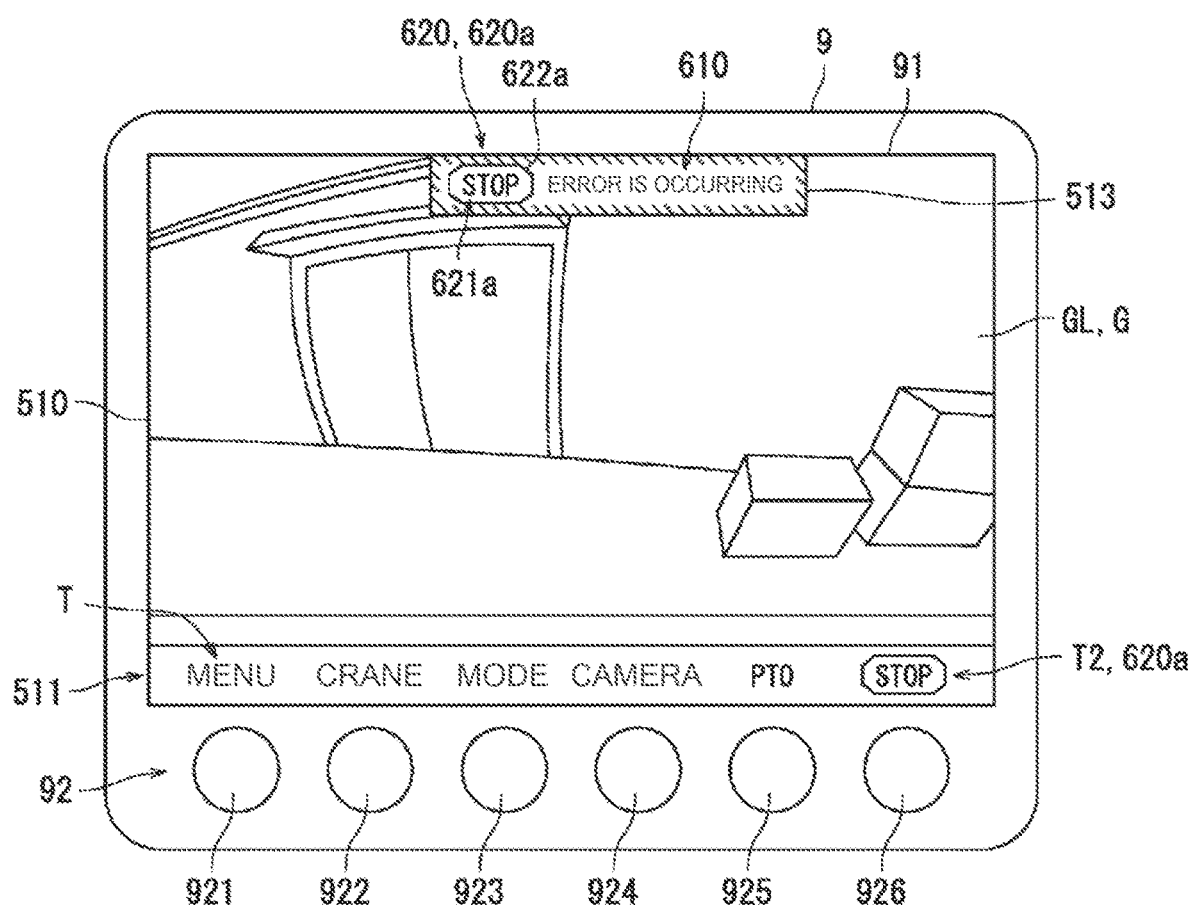
FIG. 8 is another diagram showing the display device displaying the error message and the alarm mark image.

FIG. 8 is a diagram showing the display device 9 displaying the error message 610 and the alarm mark image 620. In detail, FIG. 8 shows the display device 9 displaying an enlarged taken image GL on the home screen 510. As shown in FIG. 8, as the case may be, the third controller 93, based on the command from the operator, displays the taken image GL which is the taken image G enlarged.

When causing the home screen 510 to display the enlarged image GL, the third controller 93 causes the error notification image (error message 610, alarm mark image 620, and alarm display area 513's background color image) to be superimposed on the enlarged image GL. Thus, the worker, when the display device 9 is showing an enlarged image GL, can recognize that the error is occurring to the work machine 1.

Also, the imaging device 10 is provided for the worker to check for any person around the work machine 1. Thus, the area in the upper portion of the taken image G (enlarged image GL) is not important. According to the present embodiment, the alarm display area 513 is placed at the upper portion of the home screen 510. Thus, the alarm display area 513 is placed in an area in the upper portion of the enlarged image GL. As a result, an important area in the taken image G is not hidden by the alarm display area 513, thus ensuring work safety.

Then, the display device 9 is to be further described with reference to FIGS. 1 to 9. FIG. 9 is a diagram showing the display device 9 displaying the error information screen 520. The error information screen 520 is an example of a second screen.

When receiving the alarm mark selection command from the operation unit 92, the third controller 93 causes the display unit 91 to displays the error information screen 520. Specifically, when the selection item T2 (alarm mark image 620) described with reference to FIGS. 5 and 6 is selected, the third controller 93 causes the display unit 91 to display the error information screen 520. That is, when the sixth operation switch 926 is pressed down while the selection item T2 (alarm mark image 620) is displayed in the first selection item display area 511, the third controller 93 causes the display unit 91 to display the error information screen 520. The error information screen 520 is a screen that shows the error that is occurring to the work machine 1.

Figure 9:
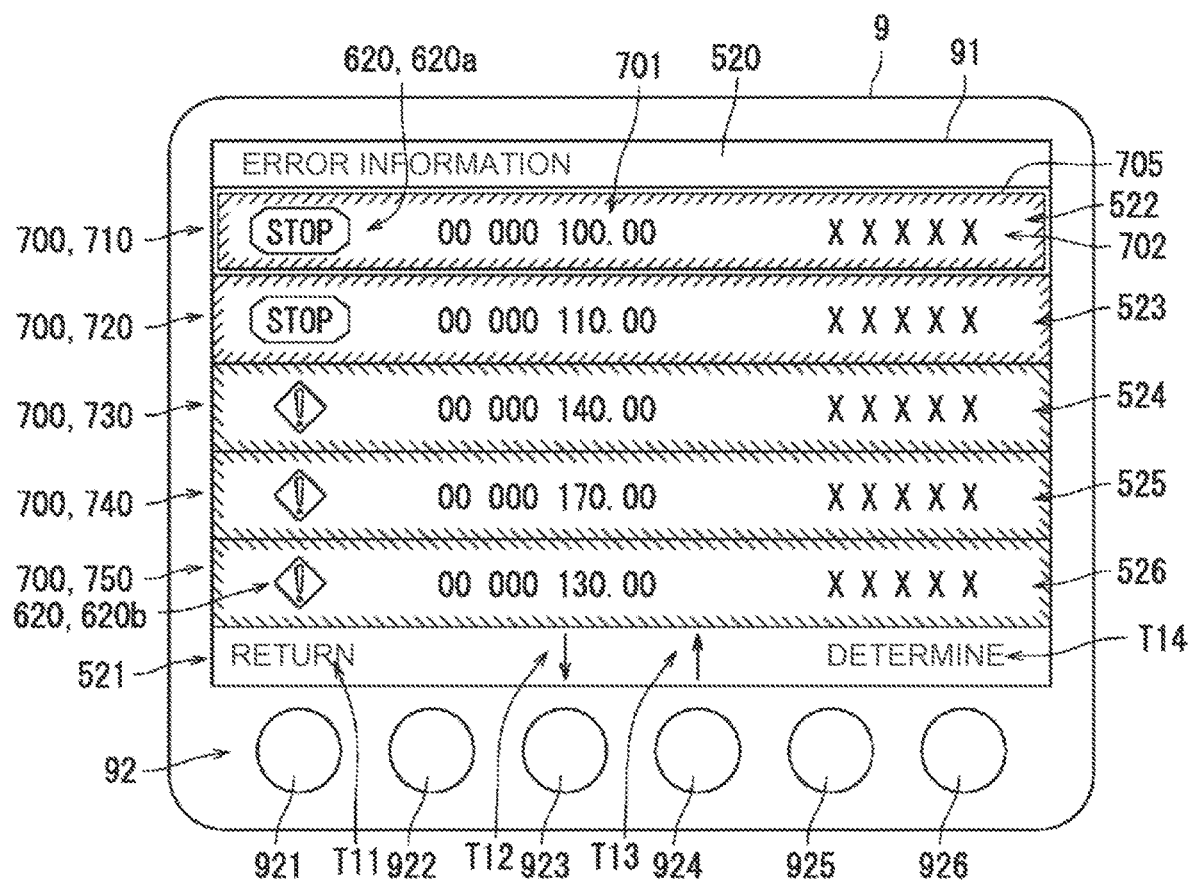
FIG. 9 is a diagram showing the display device displaying an error information screen.

As shown in FIG. 9, the error information screen 520 has a second selection item display area 521. The second selection item display area 521 displays various selection items T (T11 to T14). Specifically, the second selection item display area 521 displays letter images (letter string images) or marks showing various selection items T (T11 to T14).

The second selection item display area 521 displays the selection items T11. The selection item T11 is an item that is selected for returning to the home screen 510. When the display unit 91 is displaying the error information screen 520, the first operation switch 921 is assigned the function of receiving the function of selecting the selection item T11. That is, to the first operation switch 921, the third controller 93 assigns the function of receiving the command for transition from the error information screen 520 to the home screen 510.

When the operation unit 92 receives the command for transition from the error information screen 520 to the home screen 510, the third controller 93 causes the display unit 91 to display the home screen 510. Specifically, when the worker presses down the first operation switch 921, the third controller 93 causes the display unit 91 to display the home screen 510. In the following explanation, the transition from the error information screen 520 to the home screen 510, as the case be, is described as "transition to home screen 510".

In detail, when the operation unit 92 receives the command for transition to the home screen 510, the third controller 93 causes the display unit 91 to display any of the home screens 510 described with reference to FIGS. 5 to 8. Thus, for returning, from the error information screen 520 to the home screen 510, the screen to be displayed on the display unit 91, the third controller 93 causes the first selection item display area 511 to display the selection item T2 (alarm mark image 620). As a result, the worker, after the screen to be displayed at the display unit 91 is returned from the error information screen 520 to the home screen 510, can again cause the display unit 91 to display the error information screen 520.

Then, the display device 9 is to be further described with reference to FIGS. 1 to 9. As shown in FIG. 9, based on the alarm information, the third controller 93 causes the error information screen 520 to display the error information 700. The error information 700 shows the content of the error occurring to the work machine 1. Thus, the worker can easily recognize the content of the error occurring to the work machine 1. Specifically, the error information 700 shows an error code 701, an error name 702, and an alarm mark image 620. The third controller 93 causes the error information screen 520 to display the error code 701, the error name 702, and the alarm mark image 620 in association.

Thus, according to the present embodiment, the worker can be caused to easily recognize the content of the error occurring to the work machine 1. Also, the worker can be caused to easily recognize the alarm level of the error occurring to the work machine 1.

When a plurality of errors is occurring to the work machine 1, the third controller 93 causes the error information screen 520 to display a list of the error information 700. Thus, the worker can easily recognize content of each of the plural errors.

FIG. 9 shows an example of displaying five pieces of error information 700 on the error information screen 520. Specifically, the error information screen 520 displays first error information 710 to fifth error information 750. In detail, the error information screen 520 has a first error information display area 522 to a fifth error information display areas 526. The first error information display area 522 to the fifth error information display area 526 are placed above the second selection item display area 521. The first error information display area 522 to the fifth error information display area 526 are arranged in this order toward the second selection item display area 521. The third controller 93 causes the first error information display area 522 to the fifth error information display area 526 to respectively display the first error information 710 to the fifth error information 750.

In the example shown in FIG. 9, the first error information 710 and the second error information 720 show the first alarm level, and the third error information 730 to the fifth error information 750 show the second alarm level. As shown in FIG. 9, the third controller 93 causes the plural pieces of error information 700 to be displayed in a manner to be grouped for each alarm level. Thus, according to the present embodiment, the worker can be caused to easily recognize the alarm level of the error occurring to the work machine 1. In the order of occurrence of the error, the third controller 93 arranges the plural pieces of error information 700 with the same alarm level. In the example shown in FIG. 9, the first error information 710 and the second error information 720 are arranged in the order of occurrence of the error. The third error information 730 to the fifth error information 750 are similarly arranged in the order of occurrence of the error.

Further, as shown in FIG. 9, the third controller 93 causes the error information 700 showing the first alarm level to be displayed above the error information 700 showing the second alarm level. That is, the third controller 93 causes the error information 700 with the higher alarm level to be displayed above the error information 700 with the lower alarm level. In this way, the third controller 93 causes the plural pieces of error information 700 to be displayed in a descending order from the error information 700 with the higher alarm level. Thus, according to the present embodiment, the worker can be caused to easily recognize the alarm level of the error occurring to the work machine 1.

Further, based on the alarm level shown by the error information 700 to be displayed in the first error information display area 522 to the fifth error information display area 526, the third controller 93 determines the background colors of the first error information display area 522 to the fifth error information display area 526. For example, the third controller 93 determines the background color of the area, which displays the error information 700 showing the first alarm level, to be red, and the background color of the area, which displays the error information 700 showing the second alarm level, to be yellow. In the example shown in FIG. 9, the background colors of the first error information display area 522 and the second error information display area 523 are red, and the background colors of the third error information display area 524 to the fifth error information display area 526 are yellow.

In this way, the background colors of the first error information display area 522 to the fifth error information display area 526 are changed according to the alarm level shown by the error information 700 displayed in the first error information display area 522 to the fifth error information display area 526, making it possible to cause the worker to easily recognize the alarm level of the error occurring to the work machine 1. The first error information display area 522 to the fifth error information display area 526 are an example of partitioned areas.

Then, the display device 9 is to be further described with reference to FIGS. 1 to 9. As shown in FIG. 9, the third controller 93 causes the error information screen 520 to display a cursor 705. The cursor 705 designates the error information 700. In the example shown in FIG. 9, the cursor 705 designates the first error information 710.

Also, as shown in FIG. 9, the second selection item display area 521 further displays a selection item T12 to a selection item T14. The selection item T12 is an item that is selected when moving the cursor 705 downward. The selection item T13 is an item that is selected when moving the cursor 705 upward. The selection item T14 is an item that is selected when displaying the error information detail screen 530 to be described with reference to FIG. 10.

When the display unit 91 is displaying the error information screen 520, the third operation switch 923 is assigned the function of receiving the command for selecting the selection item T12. Thus, when the worker presses down the third operation switch 923, the third controller 93 moves the cursor 705 to a position one step lower.

When the display unit 91 is displaying the error information screen 520, the fourth operation switch 924 is assigned the function of receiving the command for selecting the selection item T13. Thus, when the worker presses down the fourth operation switch 924, the third controller 93 moves the cursor 705 to a position one step higher.

When the display unit 91 is displaying the error information screen 520, the sixth operation switch 926 is assigned the function of receiving the command for selecting the selection item T14. Thus, when the worker presses down the sixth operation switch 926, the third controller 93 causes the screen, which is to be displayed at the display unit 91, to transition from the error information screen 520 to the error information detail screen 530 to be described with reference to FIG. 10. In detail, the third controller 93, when the sixth operation switch 926 is pressed down, causes the display unit 91 to display the screen showing a detail of the error information 700 being designated by the cursor 705.

Figure 10:
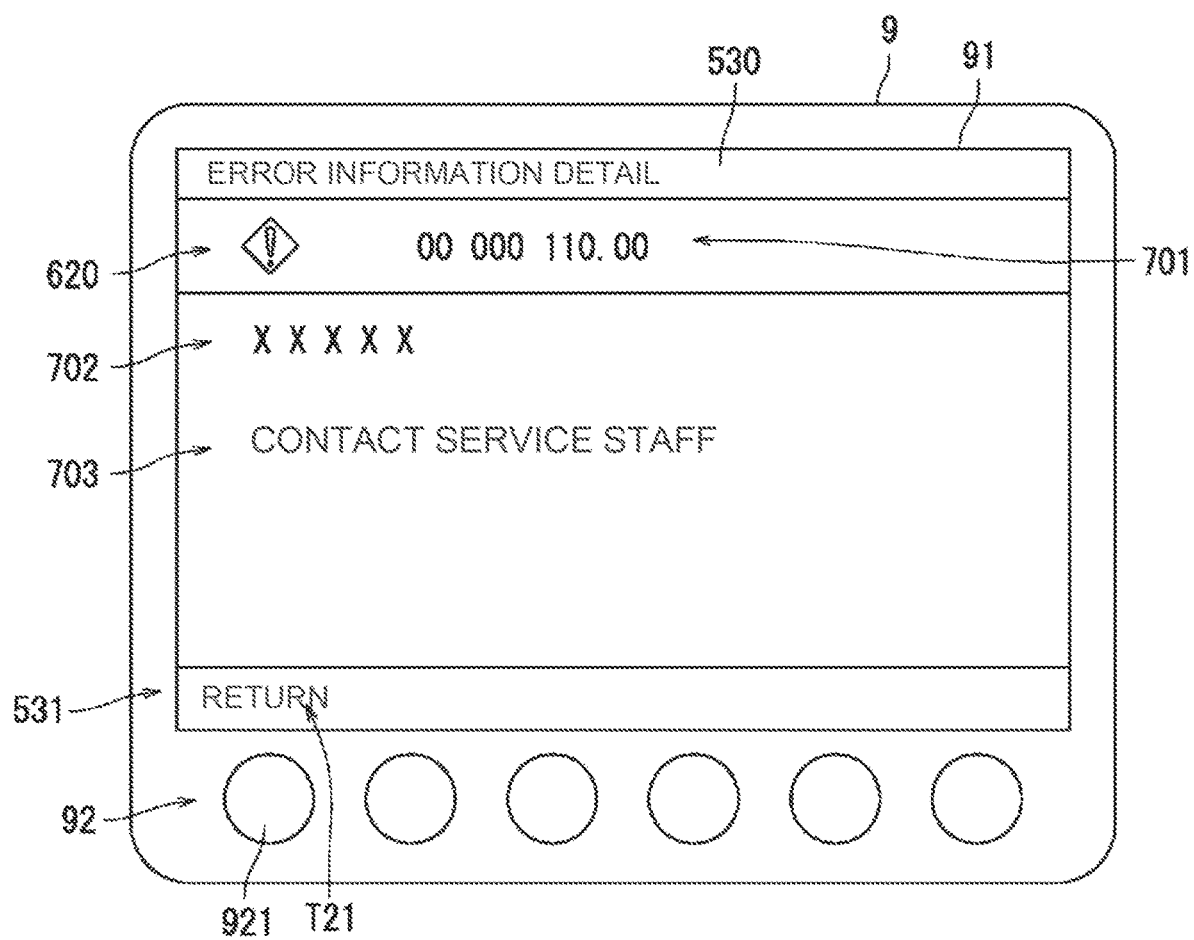
FIG. 10 is a diagram showing the display device displaying an error information detail screen.

Then, the display device 9 is to be further described with reference to FIGS. 1 to 10. FIG. 10 is a diagram showing the display device 9 displaying the error information detail screen 530. As shown in FIG. 10, based on the alarm information, the third controller 93 causes the display unit 91 to display the error information detail screen 530.

The error information detail screen 530 displays the alarm mark image 620, the error code 701, the error name 702, and detailed information 703. The detailed information 703 indicates how to deal with the error.

The error information detail screen 530 has a third selection item display area 531. In the present embodiment, the third selection item display area 531 displays a selection item T21. The selection item T21 is an item that is selected when returning to the error information screen 520.

When the display unit 91 is displaying the error information detail screen 530, the first operation switch 921 is assigned the function of receiving the command for selecting the selection item T21. Thus, when the worker presses down the first operation switch 921, the third controller 93 causes the display unit 91 to display the error information screen 520.

As explained above with reference to FIGS. 1 to 10, the present embodiment allows the worker to check the content of the error without doing a complicated operation. Specifically, according to the present embodiment; when the error occurs to the work machine 1, the third controller 93 causes the first selection item display area 511 of the home screen 510 to display the selection item T2 (alarm mark image 620).

The selection item T2 is an item that causes the screen displayed by the display unit 91 to transition from the home screen 510 to the error information screen 520. Further, when causing the first selection item display area 511 to display the selection item T2, the third controller 93 assigns, to the operation unit 92, a function of receiving a command for selecting the selection item T2. Specifically, the function of receiving command for selecting the selection item T2 is assigned to an operation switch placed below the selection item T2 in the plan view. Thus, when the error occurs to the work machine 1, the worker, merely by once operating the operation unit 92, can cause the display unit 91 to display the error information screen 520. Thus, the worker can check the content of the error without doing a complicated operation.

In the present embodiment, the letter string image indicating "ERROR IS OCCURRING" is exemplified as the error message 610, but the error message 610 is not limited to "ERROR IS OCCURRING". Referring to FIGS. 11(*a*) and 11(*b*), another example of the error message 610 is to be explained below.

FIG. 11(*a*) shows another example 1 of the error message 610. FIG. 11(*b*) shows another example 2 of the error message 610. As shown in FIG. 11(*a*), the error message 610 may be a letter string image indicating "GENERATE FILTER". Further, as shown in FIG. 11(*b*), the error message 610 may be a letter string image indicating "OVERLOAD".

"GENERATE FILTER" is a message for notifying the worker of the need for regenerating a DPF (Diesel Particulate Filter). Specifically, the work machine 1 is further equipped with the DPF and a differential pressure sensor. The DPF is a particulate removal filter that collects diesel particulates from the exhaust gas emitted from the engine 12. The differential pressure sensor measures the differential pressure of the exhaust air pressure before and after the DPF. Based on the differential pressure sensor's measured value, the first controller 11 determines whether or not a process of regenerating the DPF needs to be executed. The DPF regeneration process combusts soot (diesel particulate) accumulated in the DPF.

"OVERLOAD" is a message that tells the worker that a load acting on the boom 3 is overloaded. Specifically, the work machine 1 is further equipped with a pressure sensor to measure the pressure of the hydraulic oil supplied to the boom actuator 30 or the pressure of the hydraulic oil discharged from the boom actuator 30. Based on the pressure sensor's measured value, the first controller 11 determines whether or not the load acting on the boom 3 is overloaded.

The embodiment of the present invention has been described with reference to the accompanying drawings (FIGS. 1 to 11(*b*)). However, the present invention is not limited to the above embodiment, and can be executed in various aspects in the range without departing from its spirit. The plurality of components disclosed in the above embodiment may be properly modified. For example, one of all the components shown in one embodiment may be added to the component of the other embodiment, or some components of all the components shown in one embodiment may be removed from the embodiment.

The drawings schematically show each component as a main subject as so to facilitate understanding of the invention, and the thickness, length, quantity, spacing, and the like of each shown component is, as the case may be, different from the actual ones due to the convenience of creating the drawings. Further, it is needless to say that the configuration of each component shown in the above embodiment is merely an example and is not particularly limited, and various modifications can be made without substantially departing from the effect of the present invention.

In the embodiments described with reference to FIGS. 1 to 11(b), the work machine 1, for example, is the backhoe, but the work machine 1 is not limited to the backhoe. The work machine 1 may be any machine equipped with the display device.

Also, in the embodiments described with reference to FIGS. 1 to 11(b), the operation unit 92 includes of the plural operation switches (first operation switch 921 to sixth operation switch 926), but the operation unit 92 is not limited to the plural operation switches. For example, the operation unit 92 may include a touch sensor. The touch sensor may be superimposed on a display face of the display unit 91. Or, the operation unit 92 may include a jog dial.

Further, in the embodiments described with reference to FIGS. 1 to 11(b), the first controller 11 detected the error and created the alarm information, but the second controller 13 may detect the error and create the alarm information, or the third controller 93 may detect the error and create the alarm information.

Further, in the embodiments described with reference to FIGS. 1 to 11(b), the work machine 1 is equipped with the imaging device 10 one in number, but the work machine 1 may be equipped with a plurality of imaging devices 10. Specifically, the work machine 1 can be equipped with, in addition to the imaging device that takes the image behind the driver seat 6, at least one of an imaging device that takes the image to the left behind the driver seat 6 and an imaging device that takes the image to the right behind the driver seat 6.

Further, in the embodiments described with reference to FIGS. 1 to 11(b), the home screen 510 had the alarm display area 513, but the alarm display area 513 may be omitted.

Figure 12:
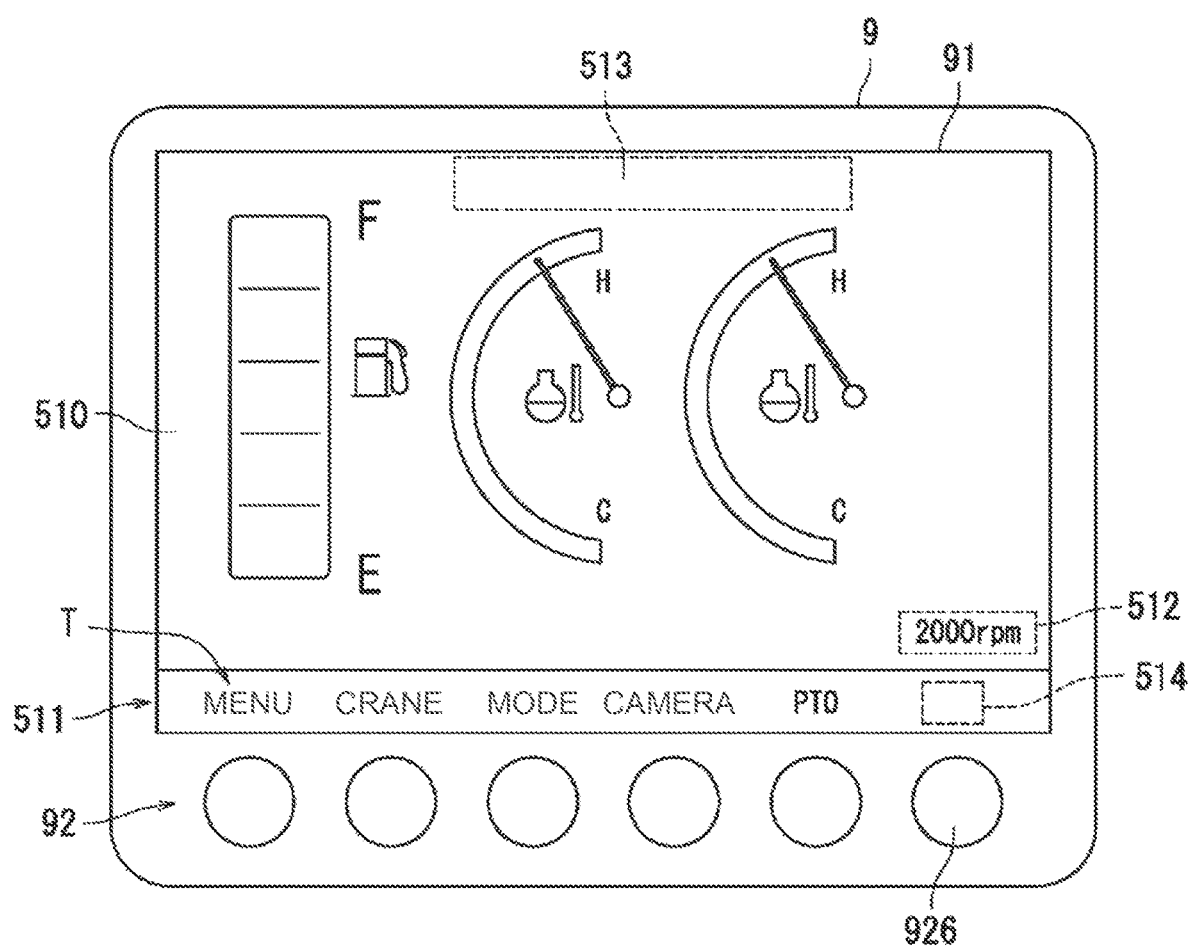
FIG. 12 is a diagram showing a modified example of the display device according to the embodiment of the present invention.

Further, in the embodiments described with reference to FIGS. 1 to 11(b), the third controller 93 changed, to the selection item T2, one of the selection items T displayed in the first selection item display area 511, but as shown in FIG. 12, a specific area 514 for displaying the selection item T2 may be provided in the first selection item display area 511.

The following is a modified example of the display device 9 of the present embodiment, with reference to FIG. 12. FIG. 12 shows the modified example of the display device 9 of the present embodiment. In detail, FIG. 12 shows the modified example of the home screen 510 that is displayed by the display device 9 before the alarm information is sent from the first controller 11 to the third controller 93.

The home screen 510 shown in FIG. 12 has the specific area 514 in the first selection item display area 511. When the first controller 11 has not detected the occurrence of the error, the selection item T is not displayed in the specific area 514. When receiving the alarm information from the first controller 11, the third controller 93 causes the specific area 514 to display the selection item T2.

INDUSTRIAL APPLICABILITY

The present invention is useful for a display device and a work machine.

DESCRIPTION OF REFERENCE NUMERALS

1: work machine
9: display device
91: display unit
92: operation unit
93: third controller
510: home screen
511: first selection item display area
513: second notification area (alarm display area)
520: error information screen
522: first error information display area
523: second error information display area
524: third error information display area
525: fourth error information display area
526: fifth error information display area
610: error message
620: alarm mark image
620a: first alarm mark image
620b: second alarm mark image
700: error information
921: first operation switch
922: second operation switch
923: third operation switch
924: fourth operation switch
925: fifth operation switch
926: sixth operation switch
T: selection item
T2: selection item

The invention claimed is:

1. A display device comprising:
a display unit configured to display a first screen having a selection item display area;
a receiving unit configured to receive a command for selecting a selection item displayed in the selection item display area; and
a control unit configured to, based on alarm information which indicates that an error has occurred, cause the selection item display area to display an alarm mark image instead of the selection item,
wherein:
based on display of the alarm mark image in the selection item display area, the control unit is configured to assign, to the receiving unit, a function of receiving an alarm mark selection command in response to the alarm mark image being selected, and
based on receipt of the alarm mark selection command by the receiving unit, the control unit is configured to cause the display unit to display a second screen indicating contents of the error.

2. The display device according to claim 1, wherein:
the first screen further has an alarm display area, and
the control unit is further configured to, based on the alarm information, cause the alarm display area to display the alarm mark image.

3. The display device according to claim 2, wherein:
the alarm information includes information that shows an alarm level set for the error, and
the control unit is configured to determine a background color of the alarm display area, according to the alarm level set for the error.

4. The display device according to claim 2, wherein the control unit is configured to, based on the alarm information, cause the alarm display area to display a given message.

5. The display device of claim 2, wherein the alarm display area is placed at an upper portion of the first screen.

6. The display device according to claim 1, wherein:
the alarm information includes information that shows an alarm level set for the error,
the alarm level includes a first alarm level and a second alarm level, the alarm mark image includes a first alarm mark image that corresponds to the first alarm level or a second alarm mark image that corresponds to the second alarm level, and the control unit is configured to, according to the alarm level set for the error, cause the first alarm mark image or the second alarm mark image to be displayed.

7. The display device according to claim 1, wherein the selection item display area is placed at a lower portion the first screen.

8. The display device as claimed in claim 7, wherein the receiving unit includes a hard key placed below the selection item.

9. The display device according to claim 1, wherein
the alarm information includes information that shows an alarm level set for the error,
the alarm level includes a first alarm level, and a second alarm level that is lower in priority than the first alarm level,
the alarm mark image includes a first alarm mark image that corresponds to the first alarm level or a second alarm mark image that corresponds to the second alarm level, and
based on occurrence of an error for which the first alarm level is set and an error for which the second alarm level is set, the control unit is configured to cause the first alarm mark image to be displayed.

10. The display device according to claim 1, wherein, when a plurality of the errors is occurring, the control unit is configured to cause the second screen to display a list of the respective contents of the plurality of errors.

11. The display device according to claim 10, wherein:
the alarm information includes information showing an alarm level set for the error, and
the control unit is configured to cause the second screen to display the contents of the plurality of errors in a manner to grouped for the each alarm level.

12. The display device according to claim 1, wherein:
the second screen includes a partitioned area that displays the contents of the error,
the alarm information includes information that shows an alarm level set for the error, and
the control unit is configured to, based on the alarm level set for the error, determine a background color of the partitioned area.

13. A work machine comprising:
the display device according to claim 1; and
a sending unit configured to send the alarm information to the display device.

14. The display device according to claim 1, wherein the receiving unit includes a hard key, and
the control unit is configured to switch an operation resulting from activation of the hard key from a first operation associated with the selection item to a second operation associated with the alarm mark image based on the alarm information.

15. The display device according to claim 14, wherein the second operation includes sending the alarm mark selection command to the control unit.

16. The display device according to claim 14, wherein the hard key is a mechanical key separate from the first screen.

* * * * *